Jan. 17, 1956 C. A. P. JOHNSON 2,731,518

TELEPHONE UNIT

Filed March 17, 1952 2 Sheets-Sheet 1

INVENTOR.
Carl A. P. Johnson
BY
Ezekiel Wolf
his Attorney

Jan. 17, 1956 C. A. P. JOHNSON 2,731,518

TELEPHONE UNIT

Filed March 17, 1952 2 Sheets-Sheet 2

INVENTOR.
Carl A.P. Johnson
BY Ezekiel Wolf
his Attorney.

United States Patent Office 2,731,518

Patented Jan. 17, 1956

2,731,518

TELEPHONE UNIT

Carl A. P. Johnson, North Quincy, Mass., assignor to S. H. Couch Company, Inc., North Quincy, Mass., a corporation of Massachusetts Application March 17, 1952, Serial No. 276,949

9 Claims. (Cl. 179—100)

The present invention relates to a telephone unit primarily for homes, offices and apartment houses and principally to a type of installation where both the telephone transmitter and receiver and the door operating controls as well as the switching controls for the telephonic communication are all contained in a single mounted unit adapted to be removed as a whole for replacement, repairs and other purposes. The unit is preferably mounted in a wall box or in a panel set in the wall where the unit may be flush with the wall or slightly projecting, dependent upon the exact structure of the mounting unit and panel.

An object of the present invention is to provide a unitary element having both transmitting and receiving signalling devices such as chimes or buzzers and switch controls for selectively operating various electrical door latches as for instance the front and rear doors, as well as switch controls for the telephone system for similarly connecting to receivers and transmitters at various other ends of the telephonic system. For instance in the present system, a single unit installed in the apartment may have a chime signal device for the front door, and a buzzer signaling device for the rear door. Two telephone switches are provided, one to talk to the front door and one to the rear door, dependent upon which of the signaling devices has been energized by an individual, either at the front or the rear door. Also individual latch control switches are provided for operating the latch on the front or the rear door of the apartment. In the system as briefly outlined above, certain improvements and advantages are gained in the construction in accordance with the present invention beyond a compact unitary structure which may be readily installed and replaced.

Among the advantages in the construction according to the present invention is the single insulated plate type mounting to which all of the operating elements are secured, including the transmitter and receiver elements at the front of the insulating plate and all the other operating switches, with the rear of the plate accommodating the necessary wiring and the various types of audible signal devices such as a buzzer and chimes, although other types of audible signal devices may also be used.

A further improvement in the present invention is the construction of the audible resonant signal which is particularly suitable for the present type mounting in providing a musical resonant note within the small space of the mounting unit itself in such a way that sufficient space is provided for the mounting of a separate buzzer unit and all of the wiring necessary for the transmitter and the loud speaker on the rear of the insulating plate. A further advantage of the present invention is that substantially all of the wiring is by means of conductive ribbons which are directly secured to the insulating plate. A further advantage of the present invention is that all of the terminal connections are recessed in the insulating plate in such a way that they are substantially clear of the surface of the insulating plate providing security against grounding and positive connections.

Other and further advantages of the present invention will be more readily understood from the description in the specification set forth below when taken in connection with the drawings illustrating an embodiment of the invention, in which.

Figure 4:
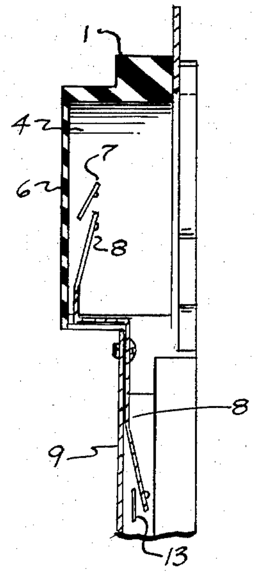

In the arrangement indicated in the drawings, 1 represents the transmitter unit, 2 the receiver unit. Both of these units are mounted in an insulating plate 3 which may be made of hard rubber, Bakelite or other suitable insulating material of which there is a great variety. For this purpose the insulating plate 3 is provided with two deep recesses 4 and 5, in which the receiver and transmitter respectively fit and are mounted. The recess 4, as indicated in Figure 4, does not extend entirely through the insulating plate but is backed by a shell 6 which is an integral part of the insulating plate and on the inside face of which are conductive spring ribbons 7, 7' and 8 for providing the electrical connections to the receiver when it is seated in the cavity 4. This is indicated more clearly in Figure 3. The electrical connection 8 is bent upwards as indicated in Figure 4, and fixed to a conductive plate 9 which serves as one connection for the back of the transmitter 1. There are two other connections to the transmitter 1 which go to the bus plates or ribbons 10 and 11.

Figures 1, 2:
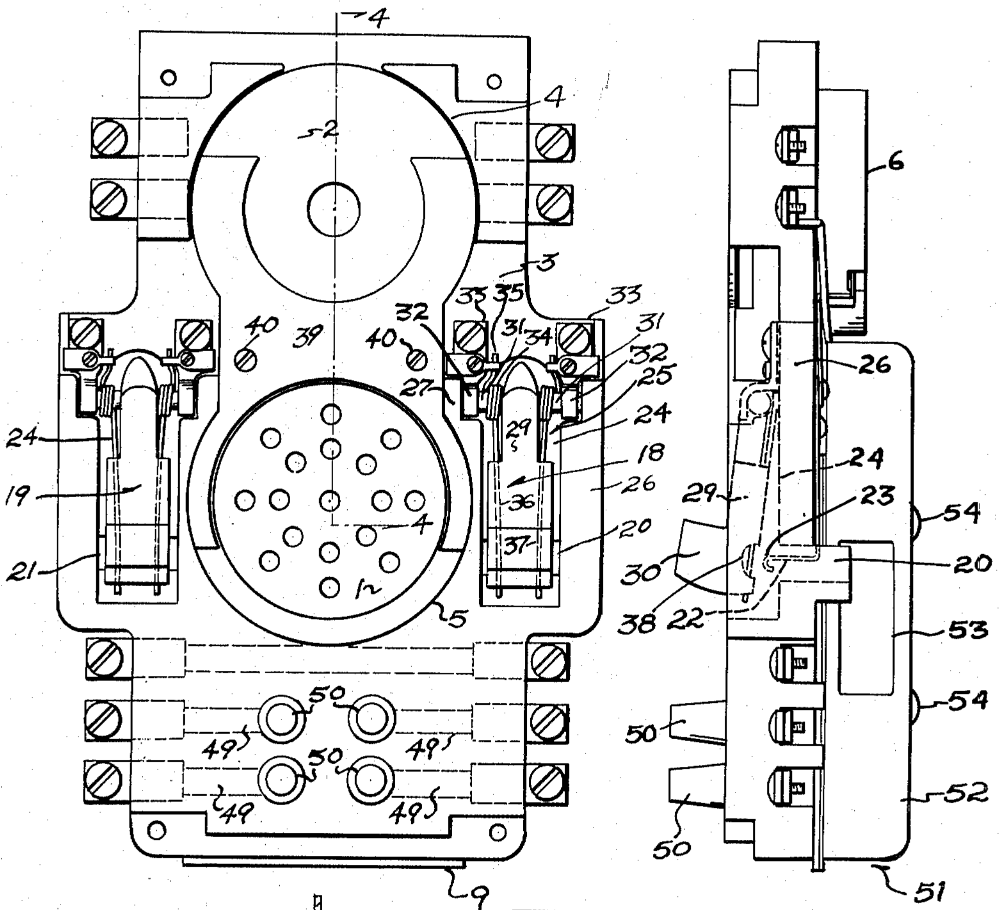
Figure 1 shows a front view of the invention with the cover plate removed.
Figure 2 shows a side view when viewed from the right of Figure 1.
Figure 3:
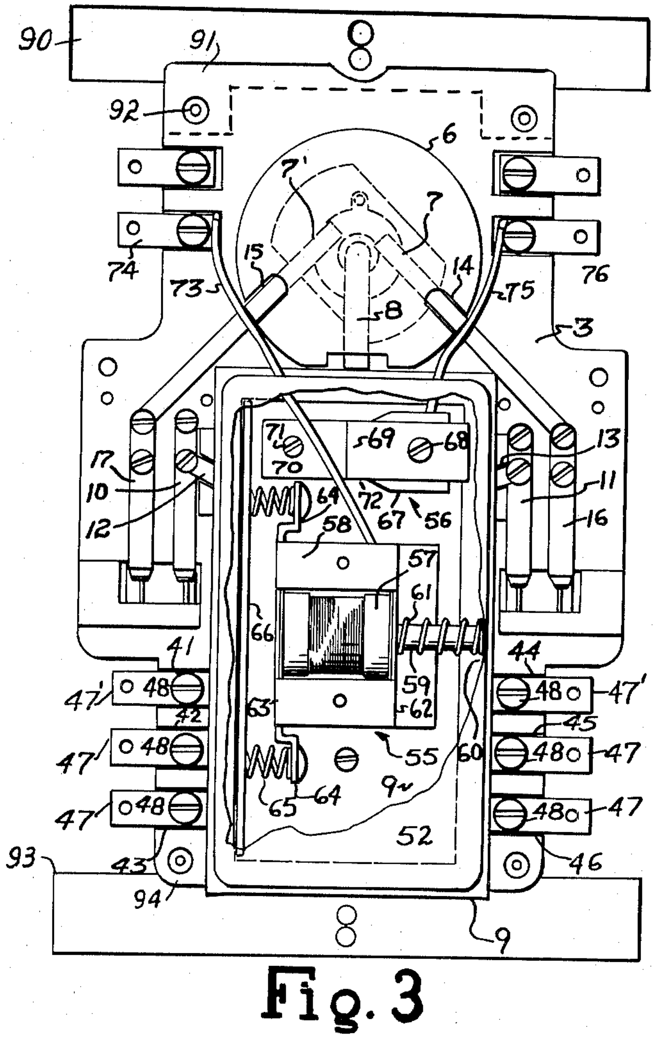
Figure 3 shows a rear view of the invention as viewed from the back of Figure 1, and, Figure 4 shows a section view taken approximately on the line 4—4 of Figure 1 with the transmitter and receiver removed.

These connections are indicated in Figure 3 by 12 and 13 respectively and they go from the bus terminals both to the same electrode or terminal on the transmitter. For this purpose the transmitter has on its back side an annular plate for the connections to the conductive ribbons 12 and 13 and a central disc plate for connection to the spring conductor 8. It will be seen from Figure 3 that the conducting elements 7 go through slots 14 and 15 in the back of the shell 6 to the bus bars or ribbons 16 and 17 respectively, one at each side of the insulating plate. Each pair of bus bars 10 and 17 and 11 and 16 are operated by so called talk switches indicated in Figure 1 by 18 and 19 respectively. The ribbons 11, 16 and 10, 17 are bent at right angles and pass through holes 20 and 21 in the plate as indicated by the right angled bend 22 which terminates in a short bend 23 projecting above the inner surface 24 of a recess 25 in which the talk switches 18 and 19 are positioned. The recess 25 is formed between two side walls 26 and 27 of the insulating plate between which the talk switches 18 are positioned, each provided with an arm 29 from the lower end of which is a short substantially right angled extension 30 rising above the surface of the insulating plate and providing a button to be pressed downward. The arm 29 is mounted by means of a pivoting shaft 31 extending on each side of the arm and made of the same material if desired. The pivoting shaft 31 on each side of the arm is set in a conductive metal bearing 32 which has terminal extensions 33 by means of which the bearings are secured to the insulating plate 3. The pivoting shaft 31 on each side has a short coil spring 34 around it with one end 35 pinned in a fixed relation to the terminals and the other end passing under and in contact with the under side of the arm 29 and extending to the lower edge of the arm beneath the button end 30. Both of these extensions 36 and 37 respectively are separated from each other and pass over a well or arcuate recess 38 providing a spring resilience in the region of the recess 38 which is just opposite the ends 23 of the turned up spring busses 11, 16 and 10, 17 respectively. The tension of the coil springs 34 is such that the arm 29 normally is in a raised position as shown in Figure 2 or away from a contact position with the ends of the spring busses 11, 16 and 10, 17 respectively. In normal operating conditions therefore, both transmitter and receiver do not make electric circuit and it is only when the arms 18 and 19 are pressed that both transmitter and receiver are connected in circuit to the opposite receiver and transmitter at the entrance or at the rear of the apartment depending upon which button is pressed; that is, one arm 18 may be for the front and the other arm 19 may be for the rear entrance. It will be seen from the arrangement above described that a single operation controls two connections in a very simplified manner.

Both transmitter and microphone are held in their cavities by means of a thin, preferably, metal plate 39, which is formed somewhat like a figure 8, with upper and lower side stems arcuate instead of straight and fitting closely to the periphery or margin of the transmitter and receiver respectively. This plate is mounted on the front of the insulating plate by two mounting screws 40.

In addition to the above connections a group of terminal connections are mounted in the insulating plate in the lower portion thereof. For this purpose the insulating plate is provided with a series of parallel recesses 41, 42, 43, extending inward from one side of the plate and similar groups of recesses 44, 45 and 46, extending inward from the other side of the plate. Terminal connectors 47 and 47′ are secured to these recesses by means of screws 48 which at the same time hold the ends of spring conductive ribbons such as 49, 49, etc., the other ends of which are positioned in opposing relation to a series of push buttons 50, 50, etc., which press the ends of the springs against a conductive plate 9 (see Figures 1, 3 and 4). The conductive plate 9 is connected to the terminals 47′ which is a common conductor for the transmitter, the receiver and the other units in the apparatus. The buttons 50 are operated to control the door latches at the various doors corresponding to the doors indicated by the difference in audible signals. The conductive plate 9 serves also as the base for a housing 51 which has a cover 52 (Fig. 2) provided with a rectangular hole or opening 53 at its side. This housing may be removed by removing the screws 54 and shows on the inside a chime or resonant sounding member 55 and a buzzer member 56. The resonant sounding member comprises a solenoid 57 which is mounted in an open channel bracket 58 whose side members have a hole corresponding to the opening in the solenoid through which the plunger 59 extends. The plunger 59 is provided with a flange 60 at the non-striking end serving to contain a coiled spring 61 which abuts against the outside of the channel wall 62 and serves therefore as a retractive force for the solenoid 59. The other side of the channels 63 has at its ends, ears 64, 64 which support weak coil springs 65 to which are secured by welding or otherwise, at the end of the coiled springs, a plate 66 which acts as a free resonant element within the housing 51. The plate 66 is supported by the spring members 65 at a distance from the end of the plate equal to about one-quarter of the length of the plate. This dimension is not exact but the position of the support should be chosen to provide the clearest ring for the kind and size of plate which is used. When the current is momentarily impressed upon the solenoid 57, the plunger 59 will be drawn against the action of the spring 61 and will impact shortly at the center of the plate 66 and since this plate is freely sustained, it will ring at a frequency dependant upon its own resonance. The housing with the opening 53 will provide added resonance due to the short space between the plate and the side wall of the housing.

The housing 51 also contains the buzzer 56 as has been previously noted. This buzzer comprises an electro-magnet 67 with a central core, not shown, but formed in line with the screw 68 forming a part of a magnetic circuit which is completed by means of the supporting bracket 69 which has a right angle bend terminating in a supporting arm 70 through which the unit is attached by means of the screw 71 to the plate 9. The screw 71 also holds a thin spring armature 72 which extends over the underside of the electro-magnet 67. When current is passed through the electro-magnet 67, the spring armature 22 will be periodically attracted by the electro-magnet in accordance with the magnetic pulses created by the current through the circuit. An insulating wire connection 73 extends from the solenoid 57 to the terminal 74 which is fixed in a recess in the insulating plate 3 and an insulating wire 75 extends from the electro-magnet 67 to the terminal 76 fixed in a recess in the insulated plate 3.

The unit in the present invention has been described in connection with a system in which a single unit operates and has speech connections to two other entrances in the building or apartment.

It will be understood that the present unit may be tied in to the operation of the number of different entrances and for this purpose additional circuit connections similar to those shown in the apparatus may be used without departing from the spirit of the present invention.

The numeral 90 refers to a top plate member secured to the flange 91 in face to face relation by screw means 92. A similar plate 93 is provided at the lower end of the insulating panel to the lower flange member 94 and is secured thereto by suitable means.

Having now described my invention, I claim:

1. A flush wall telephone receiver and transmitter mounting comprising as a unitary structure, an insulating plate element having top and bottom parallel flanges projecting from the top and bottom front portion of the plate element telephone transmitting and receiving elements supported in said insulating plate, a pair of top and bottom end supporting plates each secured to said insulating plate element of a different one of said flanges, said end supporting plates being drilled for the application of said unitary structure to a flush wall mounting panel.

2. A flush wall telephone receiver and transmitter comprising as a unitary structure an insulating plate element having mounted thereon a telephone transmitter, a telephone receiver, audible signal means, said insulating plate element being recessed in its front surface to receive said transmitter and said receiver, a thin clamping plate having arcuate arms overlying the margins of said transmitter and receiver for holding said transmitter and receiver to said insulating plate, and a plurality of circuit control means adapted to be selectively connected to operate said transmitter, receiver, and said audible signal means, including a plurality of pivoted hold down switches mounted on the front of said insulating plate and operated by being pressed against said plate for making operative said transmitter and receiver.

3. In a flush wall telephone receiver and transmitter having an insulating plate element switch means comprising a pair of pivoted hold down switches mounted on said insulated plate element one on each side of said transmitter, said switches each comprising an insulating arm pivoted at one end in two aligned conductive bearings serving as electric terminals with conductive coiled springs about the pivot at each side of the arm, said springs being fixed at one of their ends to said terminals and at the other of their ends having wire extensions lying under said insulating arms providing tension to raise the unpivoted end of the arm and a pair of contact strips lying in opposition to said wires against said insulating plate whereby when said arm is pressed, an electrical contact will be made between said wires and said strips.

4. In a flush wall telephone receiver and transmitter having an insulating plate element switch means comprising a pivoted hold down switch mounted on said insulating plate element, said switch comprising an insulating arm pivoted at one end in two aligned conductor bearings serving as electric terminals with conductive coiled springs about the pivot at each side of the arm, said springs being fixed at one of their ends to said terminals and at the other of their ends having wire extensions lying under said insulating arms providing tension to raise the unpivoted end of the arm and a pair of contact strips lying in opposition to said wires against said insulating plate whereby when said arm is pressed an electrical contact will be made between said wires and said strips.

5. In a wall telephone receiver and transmitter a resonant tone signal emitter mounted on the back of an insulating plate comprising a base having a bracket mounted thereon holding a solenoid with a plunger freely operating parallel to said base, a vibratable sounding plate, means spring mounting the sounding plate in suspension free from said base and in a plane perpendicular to said base and perpendicular to the line of action of said plunger, and a cover for said housing having an opening adjacent the face of said sounding plate in the region opposite to that where the plunger strikes.

6. In a wall telephone receiver and transmitter a resonant tone signal emitter mounted on the back of an insulating plate comprising a base having a bracket mounted thereon holding a solenoid with a plunger freely operating parallel to said base, a vibratable sounding plate, means spring mounting the sounding plate at point suspensions in a mid-line of the sounding plate, nearer the ends than the center of said sounding plate in symmetrical positions thereon, said sounding plate being in a plane perpendicular to said base and perpendicular to the line of action of said plunger, and a cover for said housing having an opening adjacent the face of said sounding plate in the region opposite to that where the plunger strikes.

7. In a wall telephone receiver and transmitter a resonant tone signal emitter mounted on the back of an insulating plate comprising a base having a bracket mounted thereon holding a solenoid with a plunger freely operating parallel to said base, a vibratable sounding plate, means spring mounting the sounding plate in suspension free from said base and in a plane perpendicular to said base and perpendicular to the line of action of said plunger, a buzzer signaling device electrically operated having an electromagnet for energizing the same, a bracket for mounting said electromagnet spaced from said base, a spring armature mounted between said base substantially parallel to it and said electromagnet, and operative between the base and said electromagnet.

8. In a wall telephone receiver and transmitter a resonant tone signal emitter mounted on the back of an insulating plate comprising a base having a bracket mounted thereon holding a solenoid with a plunger freely operating parallel to said base, a vibratable sounding plate, means spring mounting the sounding plate in suspension free from said base and in a plane perpendicular to said base and perpendicular to the line of action of said plunger, and a cover for said housing having an opening adjacent the face of said sounding plate in the region opposite to that where the plunger strikes, said plunger having a coiled spring about the end which does not come in contact with the vibratable sounding plate normally holding said plunger away from said sounding plate against the side of said cover.

9. In a communication device having an insulated panel, switch means comprising a pivoted hold down switch mounted on said panel, said switch comprising an insulated arm pivoted at one end in a conductive bearing member serving as an electrical terminal, conductive coiled spring means coiled about and secured to said bearing member at one end and having an extension at its other end lying under said insulated arm providing tension to raise the unpivoted end of the arm, and a contact member lying in opposition to said extension against said insulating panel whereby when said arm is pressed an electric contact will be made between the extension and contact member.

References Cited in the file of this patent

UNITED STATES PATENTS

| | | |
|---|---|---|
| 955,676 | Oehmen | Apr. 10, 1910 |
| 1,181,947 | Cadieux | May 2, 1916 |
| 1,341,007 | Booth | May 25, 1920 |
| 1,412,982 | Timmons | Apr. 18, 1922 |
| 1,749,593 | Loeffler | Mar. 4, 1930 |
| 1,771,324 | Cadieux | July 22, 1930 |
| 1,936,245 | Burke et al. | Nov. 21, 1933 |
| 2,070,020 | Miller | Feb. 9, 1937 |
| 2,470,600 | Bossard | May 17, 1949 |
| 2,653,192 | Shipton | Sept. 22, 1953 |
| 2,682,655 | Grohsgal | June 29, 1954 |